Patented Apr. 2, 1946

2,397,514

UNITED STATES PATENT OFFICE 2,397,514

PREPARATION OF DIETHERS OF THE GLYCOLS

Charles E. Staff, Charleston, W. Va., assignor to Carbide and Carbon Chemicals Corporation, a corporation of New York No Drawing. Application May 6, 1943,
Serial No. 485,881

11 Claims. (Cl. 260—615)

This invention relates to the preparation of diethers of alkylene monoglycols and polyglycols. More particularly, it concerns the production of such diethers by the hydrogenation, either in the vapor or liquid phase, of the acetal and/or ketal derivatives of such monoglycols and polyglycols.

Diethers of the monoglycols and polyglycols are now commonly used for a wide variety of industrial purposes. Thus, glycol diethers are being utilized as lacquer solvents; for the extraction of acetic acid from aqueous solutions thereof; and for the preparation of alkyd resins from various organic anhydrides, such as maleic and succinic anhydrides.

Four types of processes are at present available for the commercial production of diethers of the alkylene monoglycols and polyglycols. One process involves the alkylation, with an alkyl chloride such as methyl chloride, of the sodium salt of a monoether of an alkylene glycol. A second process involves the etherification of a monoether of a monoglycol or polyglycol with a lower dialkyl sulphate such as diethyl sulphate. Dimethoxy tetraethylene glycol may be made by a third process which involves reacting $\beta\beta'$-dichlorethyl ether with the sodium derivative of the monomethyl ether of ethylene glycol. A poor yield of the dimethyl ether of ethylene glycol or of diethylene glycol may be secured in a fourth procedure by treating the corresponding monomethyl ether with sulphuric acid—most of the reaction product being dioxane. The processes of each of these types are either inefficient or utilize costly and difficultly obtainable starting materials.

The present invention is based upon the discovery that by the controlled hydrogenation of the acetal and ketal derivatives of the monoalkylene and polyalkylene glycol monoethers, preferably in the presence of an active hydrogenation catalyst such as nickel, a good yield of any desired monoglycol diether and polyglycol diether may be secured, by suitable choice of the aldehyde and of the monoglycol or polyglycol monoether used for the production of the acetal. Moreover, diethers of the glycols may be produced which have any desired terminal alkyl or aryl group or groups. This is of distinct industrial importance for numerous practical reasons. Thus, diethers with one terminal methoxy group are commonly preferred for use in the extraction of acetic acid from aqueous solutions. Likewise, diethers having at least one and desirably two terminal methoxy groups are preferred for use in preparing alkyd resins from maleic and succinic anhydrides. The latter compounds with two terminal methoxy groups could only be prepared prior to this invention by the use of methyl chloride as mentioned above.

According to one modification of the present invention, an acetal derivative of an alkylene monoglycol or polyglycol monoether is prepared by reacting a suitable aliphatic or aromatic aldehyde, or an alkoxy-substituted aldehyde, with a monoalkyl ether of an alkylene monoglycol or polyglycol having the desired terminal alkoxy group. The resultant acetal derivative of such monoglycol or polyglycol monoether is then hydrogenated, preferably in the presence of a hydrogenation catalyst such as nickel, either in the liquid phase or vapor phase, but preferably in the former. A nickel catalyst such as described in the United States Patent No. 1,563,587 of M. Raney, is particularly suitable. Other hydrogenation catalysts such as platinum, palladium black, etc., may be used.

The hydrogenation reaction may be represented by the following equation, in the case of certain representative acetals and ketals:

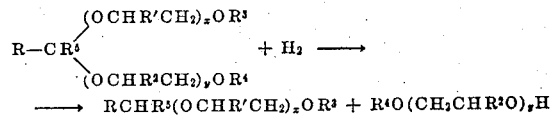

$$R-CR^5\begin{pmatrix}(OCHR'CH_2)_xOR^3\\(OCHR^2CH_2)_yOR^4\end{pmatrix} + H_2 \longrightarrow$$

$$\longrightarrow RCHR^5(OCHR'CH_2)_xOR^3 + R^4O(CH_2CHR^2O)_yH$$

wherein R designates hydrogen or an alkyl, alkoxyalkyl, aryl, or aralkyl radical; R', $R^2$ and $R^5$, respectively, designate hydrogen, the same alkyl radical, or different alkyl radicals; $R^3$ and $R^4$, respectively, designate the same alkyl radical or different alkyl radicals; and $x$ and $y$, respectively, are integers of at least 1.

The liquid phase hydrogenation preferably is conducted at elevated temperatures usually ranging from around 100° C. to 300° C., and at superatmospheric pressures which commonly range from around 500 to around 2000 pounds per square inch or more, gauge. The resultant diether of the glycol or polyglycol is recovered from the resultant reaction mixture by distillation at atmospheric pressure, or under reduced pressures. However, temperatures ranging as low as 0° C. and as high as 500° C. may be employed in the hydrogenation.

The starting materials are readily produced; and the hydrogenation reaction is readily controlled. The only observed byproduct of the hydrogenation is the glycol monoether used in making the acetal or ketal, which is produced in the ratio of 1 molecule for each molecule of the corresponding glycol diether produced.

When conducting the hydrogenation of the acetal in the vapor phase, the mixture of acetal vapors and hydrogen, with or without an inert gaseous diluent, is conducted into contact with a body of active nickel hydrogenation catalyst supported upon an inert porous support, within a hydrogenation zone preferably maintained at temperatures at which the acetal in the mixture may exist in the vapor phase in substantial amount, but at which such acetal is stable, or is resistant to decomposition by heat. Temperatures within the range between 150° C. and 400° C. may conveniently be employed, together with pressures around atmospheric, although higher and lower pressures also may be used.

The following examples serve to illustrate the invention:

EXAMPLE I

A quantity of the acetal derivative of the monomethyl ether of diethylene glycol was hydrogenated at temperatures ranging from 170° C. to 210° C., under a hydrogen pressure of 1,000 pounds per square inch, gauge, in the presence of 2% of a nickel catalyst of the type described in the United States Patent No. 1,563,587 of M. Raney. The hydrogenation reaction mixture upon distillation at atmospheric pressure yielded the methyl ethyl diether of diethylene glycol, having a boiling point of 179° C. The monomethyl ether of diethylene glycol, which was concurrently formed in the hydrogenation, was recovered for reuse in the acetal-forming reaction.

The aforesaid acetal was prepared by dissolving 45 grams of dry hydrogen chloride in a mixture of 3200 grams of the monomethyl ether of diethylene glycol and 450 grams of acetaldehyde at 23°–25° C. After standing overnight at room temperature, 200 grams of sodium acetate were added to neutralize the hydrogen chloride; and the excess glycol ether was removed by distillation before filtering off the precipitated salt. The acetal was then recovered by distillation of the filtrate under vacuum. It boiled at 147° C., under an absolute pressure of 6 mm. of mercury.

EXAMPLE II

The formal derivative of the monobutyl ether of ethylene glycol was prepared by adding a mixture of 1350 grams of the monobutyl ether of ethylene glycol, 400 grams of paraformaldehyde and 5 grams of sodium hydroxide in 5 cc. of water to a solution of 400 grams of calcium chloride in 1350 grams of the monobutyl ether of ethylene glycol and 30 cc. of concentrated hydrochloric acid. After standing for three days at room temperature, the solution was neutralized with sodium carbonate, was filtered, and the formal was recovered in high yield by distillation of the filtrate under vacuum, as a product boiling at 136° C. under an absolute pressure of 7 mm. of mercury.

The formal of the monobutyl ether of ethylene glycol thus produced was hydrogenated at temperatures ranging from 200° to 240° C., under pressures ranging from 1,000 to 1,500 pounds per square inch (gauge), in the presence of the nickel catalyst mentioned in Example I. After removal of the catalyst, the methyl butyl diether of ethylene glycol was recovered by distillation of the reaction mixture at atmospheric pressure as a liquid distilling at 152° C. The monobutyl ether of ethylene glycol concurrently formed in the hydrogenation distilled at 170° C., and was separately recovered.

EXAMPLE III

The butyral of the monomethyl ether of ethylene glycol was prepared from the monomethyl ether of ethylene glycol and butyraldehyde by reacting these materials in the presence of a small amount of sulphuric acid as a catalyst and, after neutralizing the reaction mixture with sodium hydroxide, filtering the same and distilling the filtrate under vacuum. This butyral boiled at 102° C. under an absolute pressure of 7 mm. of mercury. It was hydrogenated under the conditions described in Example II, and the reaction mixture was worked up in the same manner, yielding the same methyl butyl diether of ethylene glycol, together with a quantity of the monomethyl ether of ethylene glycol.

It will be understood that by the proper selection of the monoglycol or polyglycol monoether and the aldehyde used in making the acetal, an entire series of the dialkyl, diaryl and mixed alkyl-aryl ethers of such monoglycols and polyglycols readily may be prepared by the practice of the present invention, as is exemplified in the following table:

Table

| Glycol monoether | Aldehyde | Diether by hydrogenation |
|---|---|---|
| $CH_3OROH$ | Formaldehyde | $CH_3OROCH_3$. |
| Do | Acetaldehyde | $CH_3OROC_2H_5$. |
| Do | Butyraldehyde | $CH_3OROC_4H_9$. |
| Do | Benzaldehyde | $CH_3OROCH_2C_6H_5$. |
| $C_2H_5OROH$ | Acetaldehyde | $C_2H_5OROC_2H_5$. |
| Do | Butyraldehyde | $C_2H_5OROC_4H_9$. |
| $C_4H_9OROH$ | do | $C_4H_9OROC_4H_9$. |
| $CH_3OR'OH$ | Formaldehyde | $CH_3OR'OCH_3$. |
| Do | Butyraldehyde | $CH_3OR'OC_4H_9$. |
| Do | Hexaldehyde | $CH_3OR'OC_6H_{13}$. |
| $C_4H_9OR'OH$ | do | $C_4H_9OR'OC_6H_{13}$. |
| $CH_3OR'OH$ | Methoxyacetaldehyde | Dimethoxy triglycol. |
| Do | Methoxybutyraldehyde | Methoxy (methoxybutyl) diglycol. |
| $CH_3CH(OCH_3)CH_2OH$ | Formaldehyde | $CH_3CH(OCH_3)CH_2OCH_3$. |

In the table, R designates the group $-CH_2CH_2-$; and R' designates the group $$-CH_2CH_2OCH_2CH_2-$$

It is within the scope of the invention to substitute for the acetals of the alkylene monoglycol and polyglycol monoethers, ketals or ketone acetals which may be formed by reacting ketones and the appropriate alkylene monoglycol and polyglycol monoethers, or they may be made by reacting alcohols with alkyl acetylenes (Chem. Abstracts, 28; 4374) or by splitting off hydrogen chloride from the reaction products of anhydrous alcohols and dichloro compounds (J. A. C. S., 58; 665). Thus, di(methoxyethyl) cyclohexyl ketal may be hydrogenated in the manner hereinbefore described, with the resultant production of the methyl cyclohexyl diether of ethylene glycol, and the concurrent formation of the monomethyl ether of ethylene glycol.

Acetals of other glycol monoethers besides those specifically mentioned are suitable for use in the process. Among such acetals are those derived from the respective monoalkyl ethers of triethylene glycol, of tetraethylene glycol, and of the higher polyethylene glycols; the monoalkyl ethers of propylene glycol and of the polypropylene glycols; and the monoalkyl ethers of the mixed ethylene propylene glycol, and of mixed polyglycols.

In naming the acetal products of the condensation of the glycol mono-ethers and aldehydes the International Union rules for the naming of organic compounds may be used. (See page 558 of "Handbook of Chemistry and Physics," 23rd Edition.) Acetals produced by condensing a monoalkyl ether of an alkylene glycol and an aliphatic aldehyde may be designated 1,1-di[alkoxy(alkoxy)$_x$]alkanes wherein $x$ is an integer of at least 1; those produced from a monoalkyl ether of an alkylene glycol and an aliphatic alkoxyaldehyde may be designated 1,1-di[alkoxy(alkoxy)$_x$]alkoxyalkanes wherein $x$ is an integer of a least 1; and those produced from such a glycol ether and an aromatic aldehyde may be designated 1,1-di[alkoxy(alkoxy)$_x$]arylenes wherein $x$ is an integer of at least 1. Thus, the acetal produced by condensing a monoalkyl ether of ethylene glycol with an aliphatic aldehyde may be designated a 1,1-di(alkoxyethoxy)alkane; and that produced from a monoalkyl ether of diethylene glycol with an aliphatic aldehyde may be designated a 1,1-di(alkoxyethoxyethoxy)alkane. The acetal produced by condensing the monomethyl ether of diethylene glycol and methoxy acetaldehyde may be designated 1,1-di(methoxyethoxyethoxy)2-methoxyethane.

It will be evident that the acetals hydrogenated in accordance with the invention are complex compounds of relatively high molecular weight and long chain structure. It is surprising therefore that by the hydrogenation of these acetals, the latter are invariably split in manner to provide a diether, thereby making possible the economical production of diethers of the monoglycols and polyglycols having any desired terminal alkoxy and/or aryloxy groups.

The term "ether of an alkylene glycol" is used in the claims to designate both the ethers of the monoalkylene glycols such as those of ethylene glycol, propylene glycol and butylene glycol; and the ethers of the polyalkylene glycols such as those of diethylene glycol, of triethylene glycol, of tetraethylene glycol, of pentaethylene glycol and the higher polyethylene glycols, of dipropylene glycol, of dibutylene glycol, and of the higher polypropylene and polybutylene glycols. Likewise the expression "an acetal derivative of an ether of an alkylene glycol" is intended to designate the acetals of such monoglycol and polyglycol ethers.

The invention is susceptible of modification within the scope of the appended claims.

I claim:

1. Process for producing a diether of an alkylene glycol, which comprises hydrogenating an acetal of a monoalkyl ether of an alkylene glycol at an elevated temperature, in the presence of an active hydrogenation catalyst, and recovering from the resultant reaction mixture the diether thus produced.

2. Process for producing a diether of an alkylene glycol, which comprises hydrogenating an acetal of a monoalkyl ether of an alkylene glycol, in the presence of a hydrogenation catalyst, at an elevated temperature within the range from around 100° C. to around 300° C. and under superatmospheric pressure, and recovering from the resultant reaction mixture the glycol diether thus produced.

3. Process for producing a diether of an alkylene glycol, which comprises hydrogenating an acetal of a monoalkyl ether of an alkylene glycol selected from the group consisting of the monoglycols and the polyglycols, in the presence of a hydrogenation catalyst, at an elevated temperature within the range from around 100° C. to around 300° C. and under superatmospheric pressure, and recovering from the resultant reaction mixture the glycol diether thus produced.

4. Process for producing a diether of an alkylene glycol, which comprises hydrogenating at an elevated temperature within the range between about 100° C. and about 300° C., in the presence of an active hydrogenation catalyst, an acetal having a structure designated by the formula

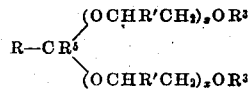

wherein R designates a radical selected from the class consisting of hydrogen, and the alkyl, alkoxyalkyl, and aryl radicals; R' represents a radical selected from hydrogen and the methyl radical; R$^3$ represents a radical selected from the alkyl radicals; R$^5$ represents a radical selected from the class consisting of hydrogen and the alkyl radicals; and $x$ represents an integer within the range from 1 to 6; and recovering from the resultant reaction mixture the diether thus produced.

5. Process as defined in claim 4, wherein said derivative is a ketal of an alkylene glycol monoalkyl ether.

6. Process for producing a dialkoxy ether of an alkylene glycol which comprises conducting a mixture of hydrogen and vapors of an acetal of a monoalkyl ether of an alkylene glycol into contact with an active hydrogenation catalyst within a hydrogenation zone maintained at a temperature within the range between around 150° C. and 400° C., withdrawing from such zone the resultant reaction mixture, and separating from the latter the dialkoxy ether of an alkylene glycol present therein.

7. Process for producing dimethoxy triglycol which comprises hydrogenating 1, 1, di(methoxyethoxyethoxy) 2-methoxyethane, in the presence of a hydrogenation catalyst, at a temperature within the range from around 100° C. to around 300° C. and under superatmospheric pressure, and recovering the dimethoxy triglycol from the resultant reaction mixture.

8. Process for producing a diether of an alkylene glycol, which comprises hydrogenating a 1,1-di[alkoxy(alkoxy)$_x$]alkane wherein $x$ is an integer of at least 1, at a temperature within the range from around 100° C. to around 300° C., in the presence of a hydrogenation catalyst, and recovering from the resultant hydrogenation reaction mixture the diether of an alkylene glycol thus produced.

9. Process for producing a diether of an alkylene glycol, which comprises hydrogenating a 1,1-di[alkoxy(alkoxy)$_x$]alkoxyalkane wherein $x$ is an integer of at least 1, at a temperature within the range from around 100° C. to around 300° C., in the presence of a hydrogenation catalyst, and recovering from the resultant hydrogenation reaction mixture the diether of an alkylene glycol thus produced.

10. Process for producing a diether of an alkylene glycol, which comprises hydrogenating a 1,1-di[alkoxy(alkoxy)$_x$]arylene wherein $x$ is an integer of at least 1, at a temperature within the range from around 100° C. to around 300° C., in the presence of a hydrogenation catalyst, and recovering from the resultant hydrogenation reaction mixture the diether of an alkylene glycol thus produced.

11. Process for producing a diether of an ethylene glycol, which comprises hydrogenating a 1,1-di[alkoxy(ethoxy)$_x$]alkane wherein $x$ is an integer of at least 1, at a temperature within the range from around 100° C. to around 300° C. in the presence of a hydrogenation catalyst, and recovering from the hydrogenation reaction mixture the diether of an ethylene glycol thus produced.

CHARLES E. STAFF.